(12) United States Patent
Chang

(10) Patent No.: US 7,467,397 B2
(45) Date of Patent: Dec. 16, 2008

(54) DISC PLAYER

(75) Inventor: Yen-Jen Chang, Kaohsiung (TW)

(73) Assignee: Qisda Corporation, Gueishan Hsiang (TW)

( * ) Notice: Subject to any disclaimer, the term of this patent is extended or adjusted under 35 U.S.C. 154(b) by 666 days.

(21) Appl. No.: 10/987,792

(22) Filed: Nov. 12, 2004

(65) Prior Publication Data
US 2005/0108739 A1    May 19, 2005

(30) Foreign Application Priority Data
Nov. 13, 2003   (TW) ............... 92131786 A

(51) Int. Cl.
*G11B 17/03* (2006.01)
(52) U.S. Cl. .................................... 720/655
(58) Field of Classification Search .................. 720/655
See application file for complete search history.

(56) References Cited

U.S. PATENT DOCUMENTS 5,355,357 A    10/1994  Yamamori et al.
6,128,265 A *  10/2000  Leung ..................... 720/655
6,316,854 B1   11/2001  Liang et al.
2004/0013070 A1* 1/2004 Rafferty ................. 369/75.1
2004/0187143 A1* 9/2004 Tolkachev et al. ......... 720/655

FOREIGN PATENT DOCUMENTS

CN    1299131 A    6/2001

* cited by examiner

*Primary Examiner*—Allen T Cao
(74) *Attorney, Agent, or Firm*—Snell & Wilmer, L.L.P.

(57) ABSTRACT

A disc player is provided. The disc player includes a driving device, a chassis and a cover. The driving device is for driving a disc. The chassis, which accommodates the driving device, has a bottom surface for supporting the disc player and a top surface opposite to the bottom surface. At least a portion of the driving device protrudes on the top surface. The cover, movably connecting to the chassis, is selectively in an open state or a closed state in relation to the chassis. When the cover is in the open state, it is capable of holding and accommodating the disc and separates the disc from the driving device. When the cover is in the closed state, it overlaps the top surface and engages the driving device with the disc.

19 Claims, 7 Drawing Sheets

DISC PLAYER

CROSS-REFERENCE TO RELATED APPLICATION

This Application claims the right of priority based on Taiwan Patent Application No. 092131786 filed on Nov. 13, 2003.

FIELD OF INVENTION

The present invention relates to a disc player and a cover thereof

BACKGROUND OF THE INVENTION

For a variety of disc player devices on the market, the way to place the disc inside the disc player can be categorized into two types, namely a drawer type and a cover type. The cover type of disc player device, as shown in FIG. 1, includes a disc device 100, a driving device 110, a chassis 120 and a cover 130. To facilitate the placement of the disc 140 inside the disc player, the cover 130 opens at an angle, generally greater than 45 degrees.

However, subject to the limitation of usage space and the consideration for ease of use, most of the cover type disc players cannot satisfy consumer demand. Therefore, a novel disc player is needed to result in a better way for disc placement.

SUMMARY OF THE INVENTION

An object of the present invention is to provide a disc player that requires less opening space for disc placement.

Another object of the invention is to provide a novel disc placement device.

Still another object of the invention is to provide a disc player cover that requires less opening space for disc placement.

The present invention discloses a disc player including a novel cover. The disc player includes a driving device, a chassis, and a cover. The driving device is for driving a disc; the chassis, accommodating the driving device, has a bottom surface for placing the disc player, and a top surface that is opposite to the bottom surface. At least a portion of the driving device is protruded on the top surface. The cover is movably connected to the chassis, and is selectively in an open state or a closed state in relation to the chassis. When a cover moves to the open state, the cover can be loaded with and subsequently accommodate the disc. In such an open state, the cover separates the disc from the driving device. On the other hand, when the cover moves to the closed state, the cover overlaps the top surface and engages the driving device with the disc.

From the detailed description and the accompanied drawings and below, those skilled in the art can easily understand the features and advantages of the present invention.

DETAILED DESCRIPTION

The present invention provides a disc player cover, generally for use in a disc player. Such a disc player can be, but is not limited to, a CD player, a VCD player, a DVD player, a complex multifunctional player, or a disc player for computer use. However, such a disc player may also include another form of disc driving device, such as, but not limited to a disc-cleansing device.

Figure 1:
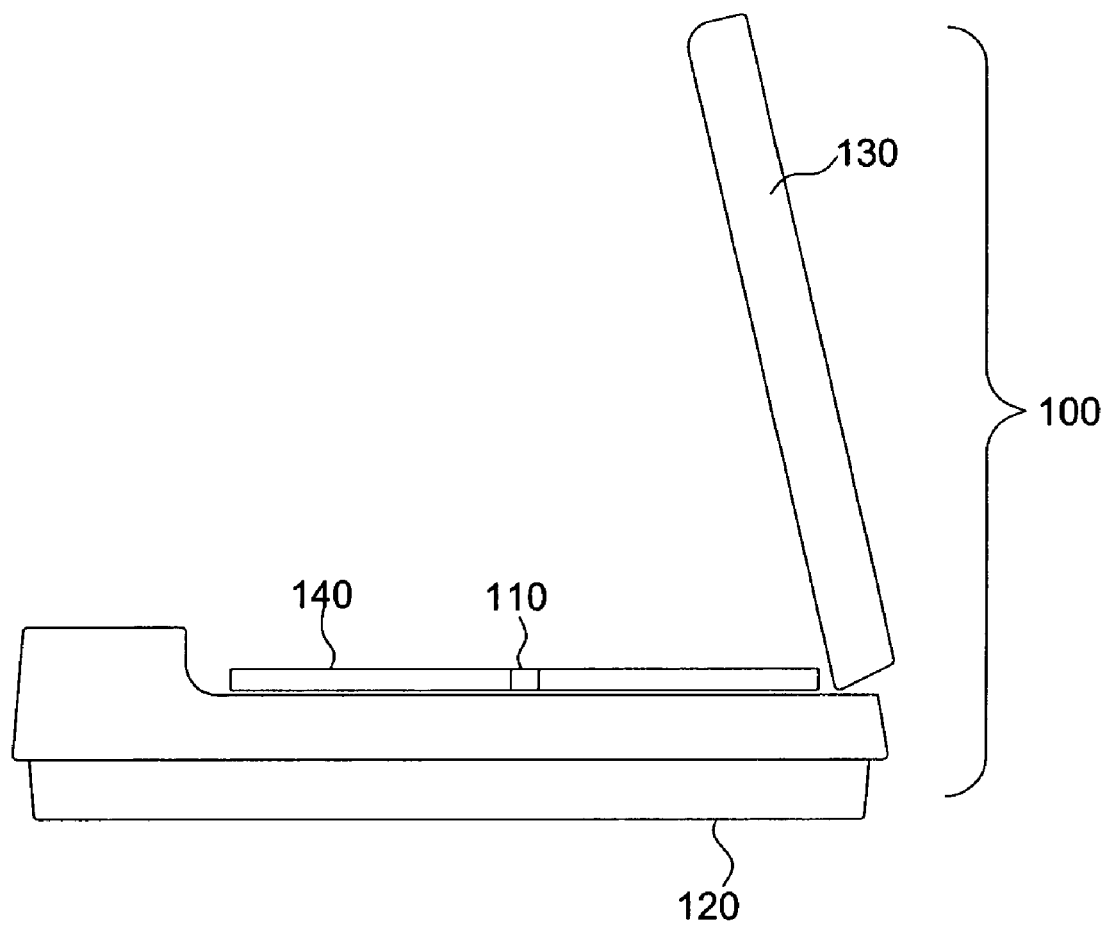
FIG. 1 is a schematic view showing a prior art cover type disc player.
Figure 2A:
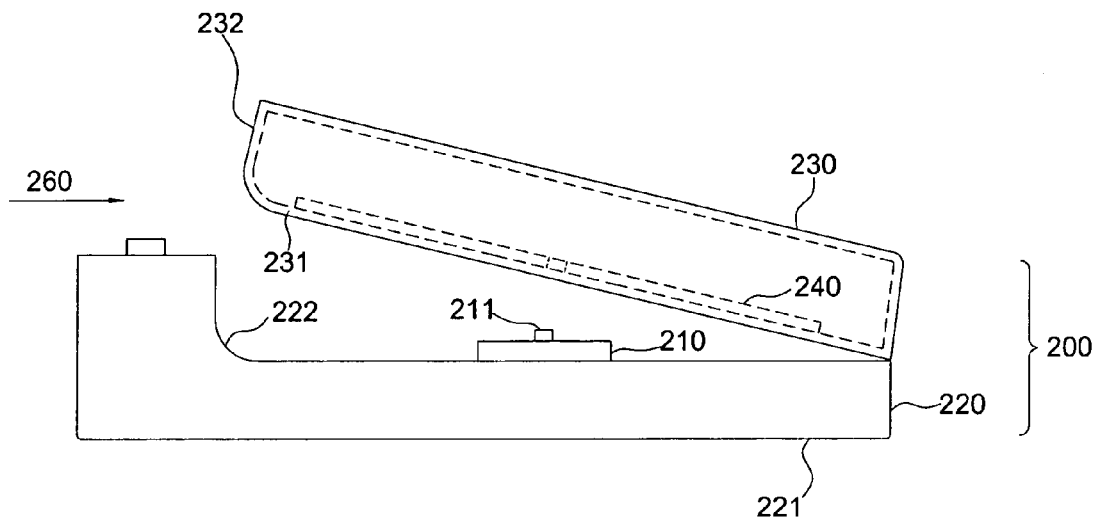
FIG. 2a is a side view showing a disc player in accordance with an embodiment of the present invention, wherein the cover of the disc player is rotatably connected to the chassis.
Figure 2B:
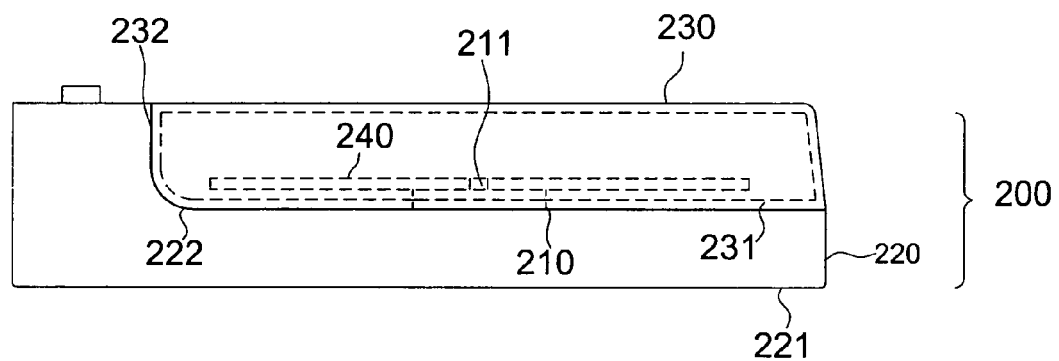
FIG. 2b is a side view showing a disc player in accordance with an embodiment of the present invention, wherein the cover of the disc player is rotatably connected to the chassis.

Referring to FIGS. 2a and 2b, the disc player 200 includes a driving device 210, a chassis 220, and a cover 230. FIGS. 2a and 2b are the side views of a disc player 200 in different states. The driving device 210, having a protrusion 211 in the middle, is used for driving disc 240. The chassis 220, having a bottom surface 221 for placing the disc player 200 and a top surface 222 opposite to the bottom surface 221, accommodates the driving device 210. At least a portion of the driving device 210 protrudes from the top surface 222. The cover 230 is moveably connected to the chassis 220, and is selectively in an open state (FIG. 2a) or a closed state (FIG. 2b) in relation to the chassis 220.

The cover 230 is rotatably connected to the chassis 220 as illustrated in FIG. 2a. When the cover 230 moves to the open state, the cover 230 can be loaded with and subsequently accommodates the disc 240. In such an open state, the cover 230 separates the disc 240 from the driving device 210. When the cover 230 moves to the closed state, as illustrated in FIG. 2b, the cover 230 overlaps the top surface 222, and engages the driving device 210 with the disc 240.

Figure 2C:
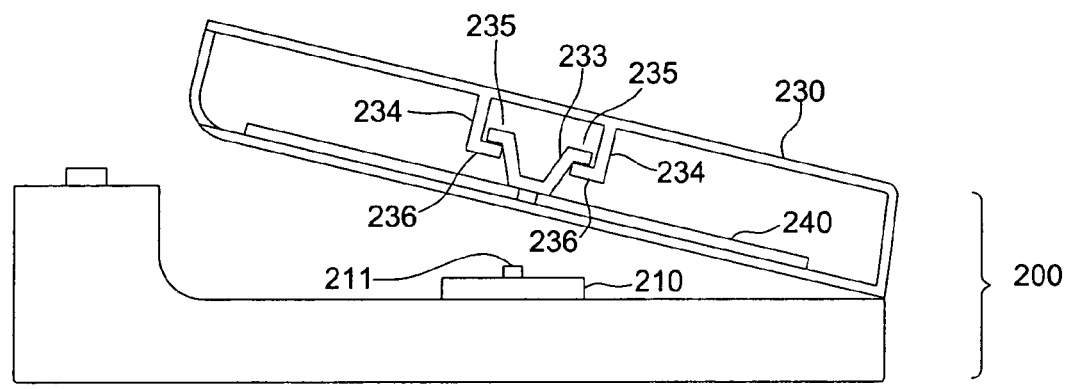
FIG. 2c is a side view of a disc player in accordance with an embodiment of the present invention, wherein the cover is rotatably connected to the chassis.
Figure 2D:
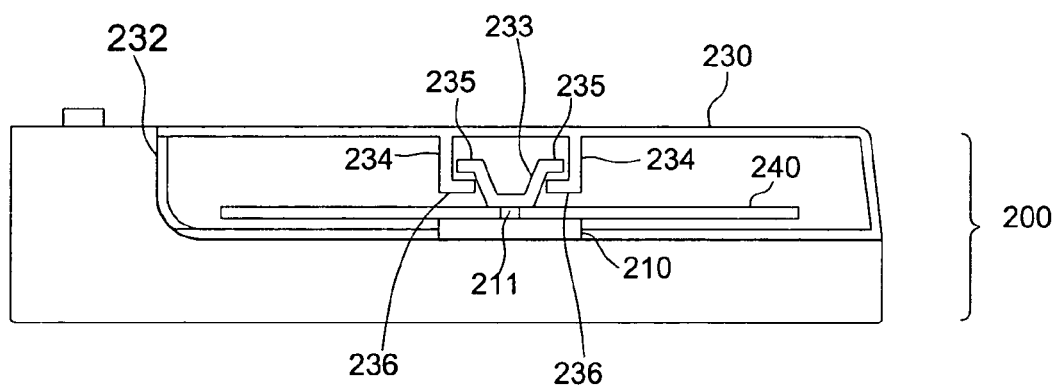
FIG. 2d is a side view of a disc player in accordance with an embodiment of the present invention, wherein the cover is rotatably connected to the chassis.
Figure 2E:
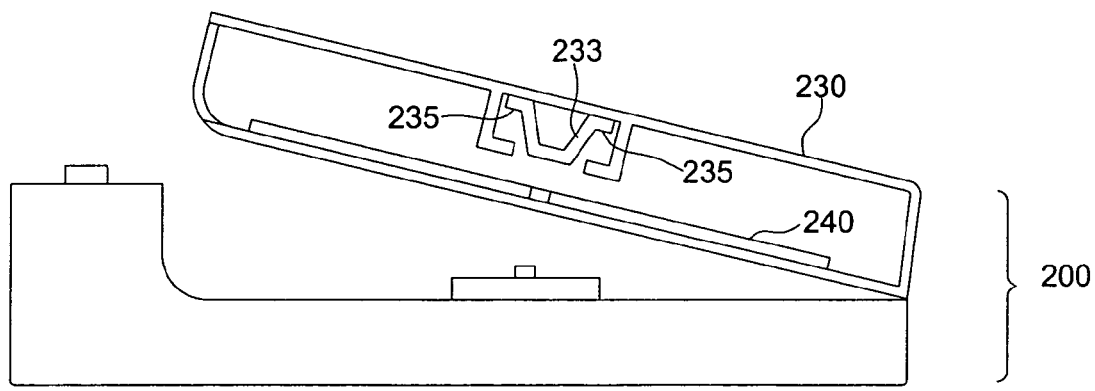
FIG. 2e is a side view of a disc player in accordance with an embodiment of the present invention, wherein the cover is rotatably connected to the chassis.
Figure 2G:
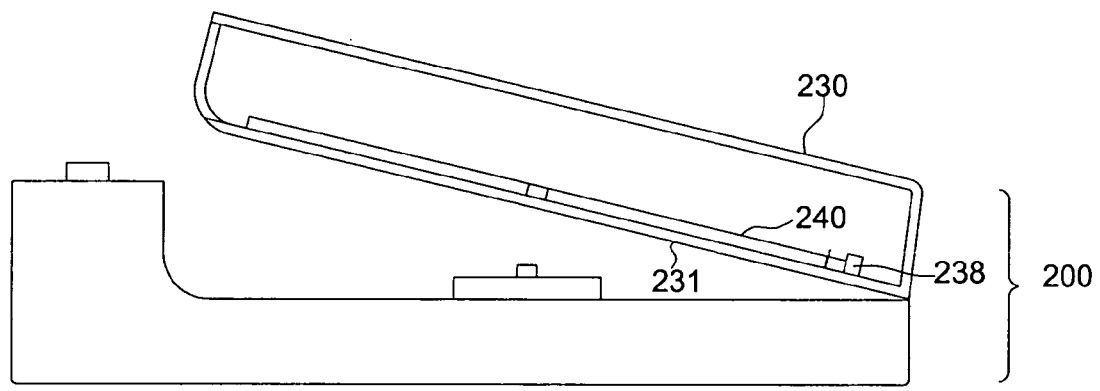
FIG. 2g is a side view of a disc player in accordance with an embodiment of the present invention, wherein the cover is rotatably connected to the chassis.
Figure 2F:
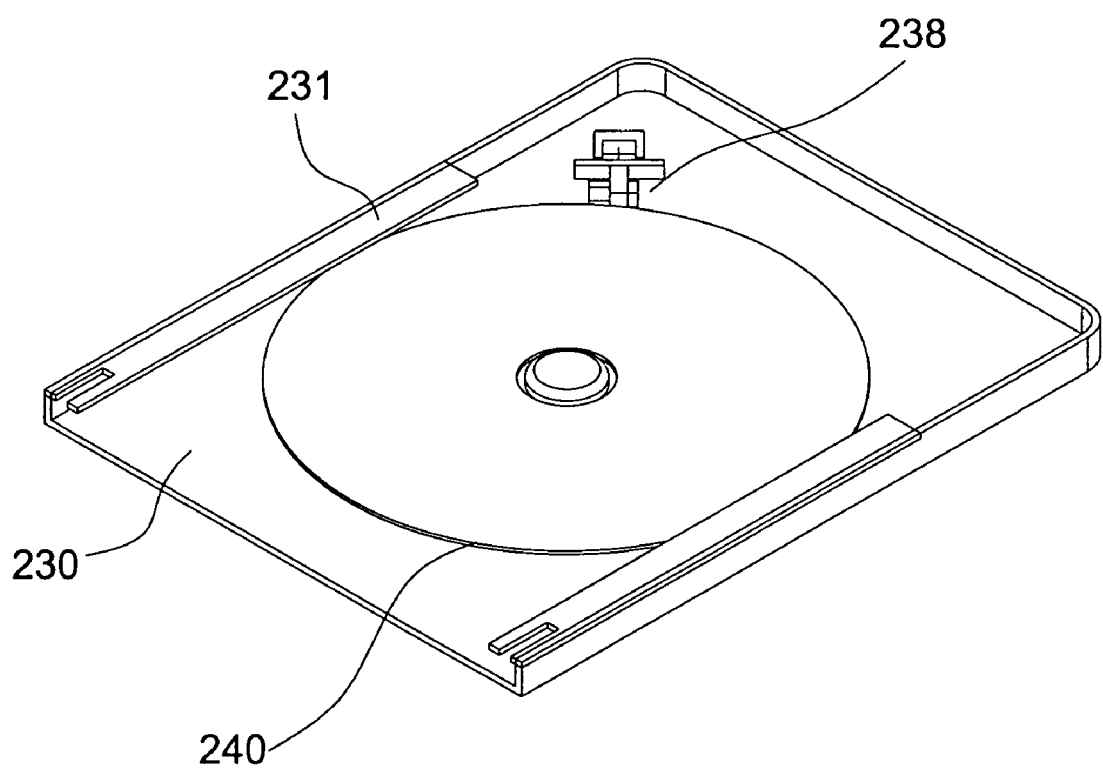
FIG. 2f is the three-dimensional view of the cover of a disc player in accordance with an embodiment of the present invention.

Referring to FIG. 2f, on each of the two sides of the cover is provided a protrusion 231, for supporting the disc 240 in the open state. The protrusion 231 supports the rim of the disc 240 when the cover 230 is in the open state, and there is no need to provide a protrusion 231 on each of the four sides of the cover 230. When the cover 230 is in the closed state, as illustrated in FIG. 2b, the disc 240 is upheld by the driving device 210 while not touching the protrusion 231 so as to prevent it from scratching the disc 240. The front portion of the cover 230 is formed with an opening 232. When the cover 230 is in the open state, the disc 240 can be slid into the cover 230 and on the protrusion 231 through the opening 232.

Referring to FIGS. 2c and 2d, the cover 230 of the disc player 200 further includes a clamper 233, and an optional clamper holder 234. The clamper 233 is disposed under the cover 230 and has an annular flange 235. The annular flange 235 has a first diameter. The optional clamper holder 234, when in need, can be positioned and connected under the cover 230. The clamp holder 234 has an annular protrusion 236. In order for the annular protrusion 236 to hold the clamper 233, the annular protrusion 236 has an inner diameter smaller than the first diameter of the annular flange 235. When the cover 230 is in the open state, the clamp holder 234 can hold the clamper 233 or, as shown in FIG. 2c, the clamp holder 234 can fasten the position of the clamper 233. When the cover 230 is in the closed position, as shown in FIG. 2d, the clamper 233 and the protrusion 211 of the driving device 210 can clamp the disc 240 respectively so as to fix the disc 240 in its position.

When the cover 230 is in the closed position, as shown in FIG. 2d, in order to strengthen the clamping force applied on the disc 240 by the clamper 233 and the protrusion 211 of the driving device 210, a portion of the driving device 210 corresponding to the clamper 233 is made of a first material, while a portion of the clamper 233 corresponding to the driving device 210 is made of a second material. The first and second materials are attracted to each other. Therefore, when the cover is in the closed state, the clamper 233 and the driving device 210 are attracted to each other, and thus strengthen the force to clamp the disc 240. The first material and the second material are magnetically attracted to each other. In other words, at least one of the first and second materials is magnetic, such as a magnet, while the other material is a material subject to a magnetic force, such as iron, alloy of cobalt and nickel, or magnet.

When the cover 230 is in the open state, as illustrated in FIG. 2e, in order to reduce the contact between the clamper 233 and the disc 240 being placed therein, the annular flange 235 is made of a third material, while the cover 230 corresponding to a portion of the annular flange 235 is made of a fourth material. The third and fourth materials are attracted to each other. Therefore, when the cover 230 is positioned in the open state, the annular flange 235 and the cover 230 are attracted to each other. In other words, at least one of the third and fourth materials is magnetic, such as a magnet, while the other is a material subject to the magnetic force, such as iron, alloy of cobalt and nickel, or other magnetic material.

The magnetic force between the first and second materials is greater than that between the third and fourth material. Therefore, when the cover 230 is positioned in the closed state, the clamper 233 is apart from the cover 230, and subsequently engages the disc 240 together with the driving device 210, as illustrated in FIG. 2d.

When the cover 230 is to move to the closed state, in order to prevent the cover 230 from having any difficulty moving to the closed state due to deviation of the disc 240 from the center of the driving device 210, the cover 230 in the present invention, as illustrated in FIG. 2f, can further include one or more positioning devices 238 so as to assist the positioning of the disc 240 when the cover is in the open state, as illustrated in FIG. 2g.

When the cover 230 is positioned in the open state, the positioning device 238 can hold the disc 210 and thus provide a positioning function; on the other hand, when the cover 230 is in the closed position, the positioning device 238 can disengage from the rim of the disc 240 through an actuating mechanism (not shown) so as to prevent impeding the rotation of the disc 240.

Figure 3A:
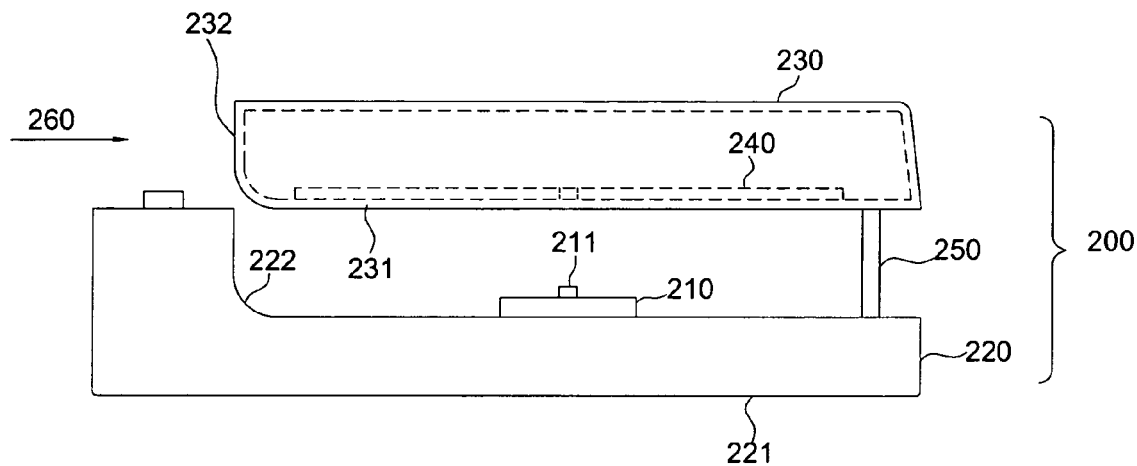
FIG. 3a is a side view of a disc player in accordance with an embodiment of the present invention.
Figure 3B:
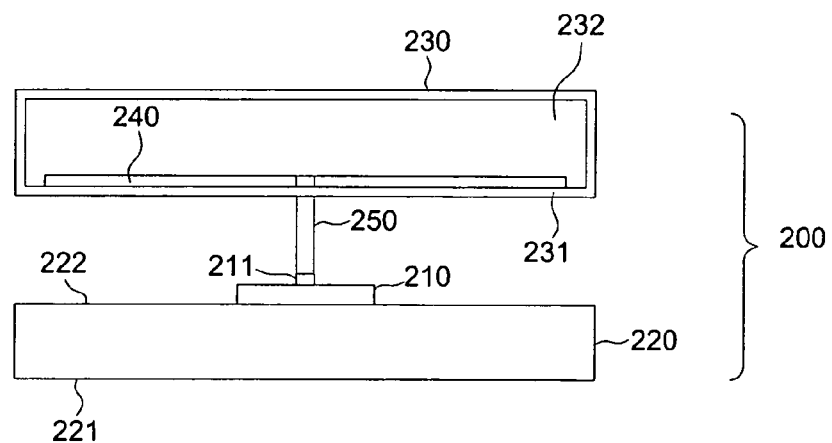
FIG. 3b is a cross-sectional view of a disc player in accordance with an embodiment of the present invention, wherein the cover is connected to the chassis and movable in a vertical direction.

Referring to FIGS. 3a and 3b, in accordance with another embodiment of the present invention, the cover 230 can also move vertically to connect to the chassis 220. FIG. 3a is the side view of the disc player 200 in accordance with the embodiment, which corresponds to the same observant direction as in FIG. 2a. FIG. 3b is the side view of the disc player 200 in accordance with the embodiment following the same observant direction as illustrated by the arrow 260, wherein the chassis 220 supports the cover 230 via the connecting device 250. As shown in the exemplary of FIGS. 3a and 3b, except the connecting device 250 and the cover 230 being vertically moveable to connect to the chassis 220, the functionalities, compositions and features of the other elements, unless otherwise mentioned, are substantially the same as those illustrated in FIGS. 2a-2g, and thus are not described in details herein. Meanwhile, same numerical references represent similar elements or those that are substantially the same.

However, as the clamping device mentioned in earlier embodiments, it can also be implemented in this embodiment, and thus will not be described herein again.

Figure 4A:
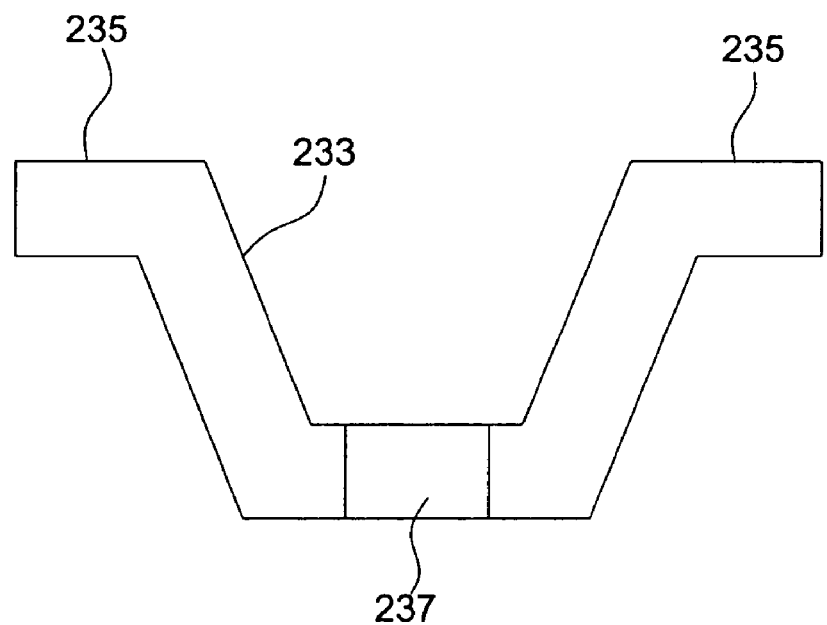
FIG. 4a is a cross-sectional view of the clamper of a disc player in accordance with an embodiment of the present inventions.
Figure 4B:
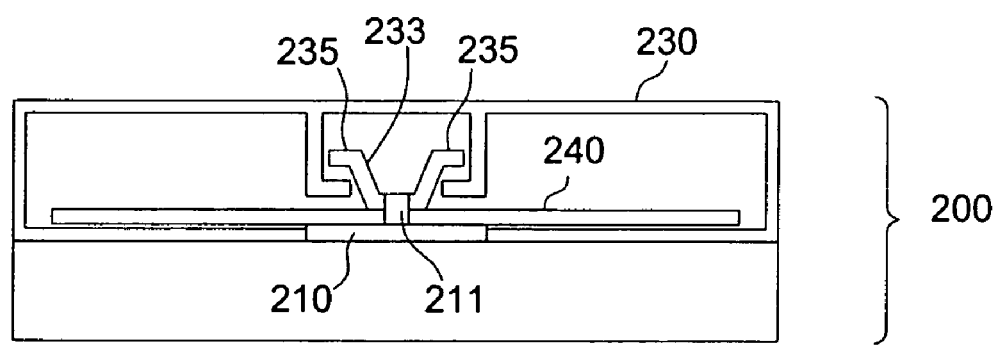
FIG. 4b is a cross-sectional view of a disc player in accordance with an embodiment of the present invention, wherein the disc player includes the clamper as shown in FIG. 4.

When the cover 230 is in the closed state, in order to further ensure the positioning of the disc 240, the middle of the clamper 233 of the disc player 200 in accordance with the present invention is formed with a hole 237. FIG. 4a is a cross-sectional view of the clamper 233. The hole 237 corresponds to the protrusion 211 on the driving device 210, as shown in FIG. 4b. Thus, when the cover 230 is in the closed state, as illustrated in FIG. 4b, the protrusion 211 can pass through the hole in the center of the disc 240 and the hole 237 so as to engage the disc 240 together with the clamper 233.

Referring to FIGS. 2a, 2b or FIGS. 3a, 3b, the protrusion 231 supporting a portion of the disc includes a lubricant material so as to prevent the protrusion 231 from scratching the disc 240.

When a user is to place a disc in the disc player 200 of the present invention, the disc 240 can be placed from the opening 232 following the direction of the arrow 260 after the cover 230 is moved to the open state, as illustrated in FIG. 2a or 3a. When a user intends to take out the disc 240, the cover 230 is moved from the closed state, as illustrated in FIG. 2b or 4b, to the open state, to allow the removal of the disc 240. Since the disc player 200 of the present invention requires a smaller angle or a limited height to open, the user can still easily put in and take out the disc in a limited space. When the cover 230 is positioned in the open state, the whole disc 240 can be substantially covered by the cover 230. Alternatively, through the assistance of the positioning device 238, a portion of the disc 240 is not overlapped by the cover 230 so as to facilitate disc placement. However, when the cover 230 is in the closed state, the disc 240 does not touch the positioning device 238.

By means of the detailed descriptions of what is presently considered to be the most practical and preferred embodiments of the subject invention, the features and the gist thereof are clearly described. Nevertheless, these embodiments are not intended to be construed in a limiting sense. Instead, it will be well understood that any analogous variations and equivalent arrangements will fall within the spirit and scope of the invention.

I claim:

1. A disc player for operating a disc, comprising:
   a driving device for driving said disc;

a chassis for accommodating said driving device, the chassis having a bottom surface for placing said disc player on a supporting surface, and a top surface opposite to said bottom surface, at least a portion of said driving device protruding on said top surface; and a cover movably connected to said chassis, the cover being selectively in an open state or a closed state relative to said chassis, said cover comprising a positioning device for positioning said disc when said cover is in said open state, wherein when said cover is in said open state, said cover accommodates said disc, and said disc and said driving device are separated from each other; and when said cover is in said closed state, said cover substantially overlaps said top surface and said driving device engages with said disc.

2. The disc player of claim 1, wherein said cover further comprises:

a protrusion, wherein when said cover moves to said open state, said protrusion supports said disc; and when said cover is in said closed state, said disc is not in contact with said protrusion.

3. The disc player of claim 1, wherein said cover further comprises:

a clamper for fastening said disc, said clamper being located below said cover and having an annular flange, said annular flange having a first diameter, wherein when said cover is in said closed state, said clamper and said driving device respectively fasten said disc.

4. The disc player of claim 3, wherein said cover further comprises:

a clamper holder being located below said cover and attached to said cover, said clamper holder having an annular protrusion for supporting said clamper, and said annular protrusion having an inner diameter smaller than said first diameter, wherein when said cover is in said open state, said clamper holder supports said clamper.

5. The disc player of claim 3, wherein a portion of said clamper corresponding to said driving device is made of a first material and a portion of said driving device corresponding to said clamper is made of a second material, and said first material and said second material attract each other.

6. The disc player of claim 3, wherein said annular flange is made of a third material and a portion of said cover corresponding to said annular flange is made of a fourth material, and said third material and said fourth material attract each other.

7. The disc player of claim 2, wherein a portion of said protrusion for supporting said disc comprises a lubricant material.

8. The disc player of claim 1, wherein said cover is either rotatably or vertically movably connected to said chassis.

9. A disc player for operating a disc, comprising:

a driving device for driving said disc;

a chassis for accommodating said driving device, said chassis having a bottom surface for placing said disc player on a supporting surface, and a top surface opposite to said bottom surface, at least a portion of said driving device protruding on said top surface; and a cover movably connected to said chassis, the cover being selectively in an open state or in a closed state relative to said chassis, and comprising a positioning device for positioning said disc, wherein when said cover is in said open state, said cover accommodates said disc and said disc and said driving device are separated from each other; and when said cover is in said closed state, said cover substantially overlaps said top surface and said driving device engages with said disc.

10. The disc player of claim 9, wherein said cover further comprises:

a protrusion;

wherein when said cover is in said open state, said protrusion supports said disc; and when said cover is in said closed state, said disc is not in contact with said protrusion.

11. The disc player of claim 9, wherein said cover further comprises:

a clamper for fastening said disc, said clamper being located below said cover and having an annular flange, said annular flange having a first diameter, wherein when said cover is in said closed state, said clamper and said driving device respectively fasten said disc.

12. The disc player of claim 11, wherein said cover further comprises:

a clamper holder located below said cover and attached to said cover, said clamper holder having an annular protrusion for supporting said clamper, and said annular protrusion having an inner diameter smaller than said first diameter, wherein when said cover is in said closed state, said clamper holder supports said clamper.

13. The disc player of claim 11, wherein a portion of said clamper corresponding to said driving device is made of a first material and a portion of said driving device corresponding to said clamper is made of a second material, and said first material and said second material attract each other.

14. The disc player of claim 11, wherein said annular flange is made of a third material and a portion of said cover corresponding to said annular flange is made of a fourth material, and said third material and said fourth material attract each other.

15. The disc player of claim 10, wherein a portion of said protrusion for supporting said disc is made of a lubricant material.

16. The disc player of claim 9, wherein said cover is either rotatably or vertically movably connected to said chassis.

17. A disc player for operating a disc, comprising:

a driving device for driving said disc;

a chassis for accommodating said driving device, said chassis having a bottom surface for placing said disc player and a top surface opposite to said bottom surface, at least a portion of said driving device protruding on said top surface; and a cover movably connected to said chassis, the cover being selectively in an open state or a closed state relative to said chassis, said cover including:

a protrusion;

a clamper for fastening said disc, said clamper being located below said cover and having an annular flange, said annular flange having a first diameter; and a clamper holder located below said cover and attached to said cover, said clamper holder having an annular protrusion for supporting said clamper, and said annular protrusion having an inner diameter smaller than said first diameter, wherein when said cover is in said open state, said protrusion supports said disc and said clamper holder supports said clamper, and said disc and said driving device are separated from each other; and when said cover is in said closed state, said cover substantially overlaps said top surface, said disc is not in contact with said protrusion, and said clamper and said driving device respectively clamp said disc.

18. The disc player of claim 17, wherein a portion of said clamper corresponding to said driving device is made of a first material and a portion of said driving device corresponding to said clamper is made of a second material, and said first material and said second material attract each other.

19. The disc player of claim 17, wherein said annular flange is made of a third material and a portion of said cover corresponding to said annular flange is made of a fourth material, and said third material and said fourth material attract each other.

* * * * *